US010160128B2

(12) United States Patent
Brown (10) Patent No.: US 10,160,128 B2
(45) Date of Patent: Dec. 25, 2018

(54) APPARATUS FOR USE WITH A TRIMMER TO PRODUCE A PLURALITY OF BOOKS HAVING DIFFERENT TRIM SIZES

(75) Inventor: Chris E. Brown, Lynchburg, VA (US)

(73) Assignee: LSC COMMUNICATIONS US, LLC, Chicago, IL (US)

(*) Notice: Subject to any disclaimer, the term of this patent is extended or adjusted under 35 U.S.C. 154(b) by 1554 days.

(21) Appl. No.: 12/533,830

(22) Filed: Jul. 31, 2009

(65) Prior Publication Data
US 2010/0154612 A1    Jun. 24, 2010

Related U.S. Application Data

(60) Provisional application No. 61/139,154, filed on Dec. 19, 2008.

(51) Int. Cl.
| B26D 1/01 | (2006.01) |
| B26D 5/32 | (2006.01) |
| B26D 5/34 | (2006.01) |
| B42C 19/00 | (2006.01) |
| B26D 7/01 | (2006.01) |

(52) U.S. Cl.
CPC .............. *B26D 1/015* (2013.01); *B26D 5/32* (2013.01); *B26D 5/34* (2013.01); *B26D 7/015* (2013.01); *B42C 19/00* (2013.01); *B26D 7/016* (2013.01); *B42P 2261/04* (2013.01); *Y10T 83/0524* (2015.04); *Y10T 83/7647* (2015.04)

(58) Field of Classification Search
CPC .................. B23D 33/10; B23Q 16/001; B27B 27/02–27/10; B26D 7/016
USPC ........................... 83/247, 468.5, 468.6, 468.7
See application file for complete search history.

(56) References Cited

U.S. PATENT DOCUMENTS

| 1,150,921 | A | | 8/1915 | Worthington |
| 2,316,971 | A | | 4/1943 | Overacker et al. |
| 2,626,664 | A | | 1/1953 | Regele |
| 2,679,901 | A | | 6/1954 | Cahen |
| 3,080,897 | A | * | 3/1963 | Winter ............................ 83/750 |
| 3,170,351 | A | * | 2/1965 | Krynytzky ...................... 83/157 |
| 3,245,299 | A | | 4/1966 | Klusmier et al. |
| 3,370,494 | A | * | 2/1968 | Schenck ...................... 83/155.1 |
| 3,819,173 | A | | 6/1974 | Anderson et al. |
| 3,910,142 | A | * | 10/1975 | Jureit et al. ....................... 83/74 |
| 4,175,458 | A | * | 11/1979 | Paris et al. ....................... 83/268 |

(Continued)

OTHER PUBLICATIONS

United States Patent and Trademark Office, "Non-Final Office Action", issued in connection with U.S. Appl. No. 14/744,827, dated Mar. 23, 2016, 14 pages.

(Continued)

*Primary Examiner* — Kenneth E Peterson
(74) *Attorney, Agent, or Firm* — Hanley, Flight & Zimmerman, LLC (57) ABSTRACT

Apparatus for use with a trimmer to produce a plurality of books having different trim sizes are described. In a described example, a trimmer for use with a bindery system includes a cutting surface and a first movable backstop adjacent the cutting surface to be engaged by a first book. Additionally, the trimmer includes a second movable backstop adjacent the cutting surface and spaced from the first movable backstop. The second movable backstop is to be engaged by a second book. Further, the trimmer includes a cutter movable relative to the cutting surface to cut a face of the first book to form a book having a first size and to cut a face of the second book to form a book having a second size different than the first size.

21 Claims, 10 Drawing Sheets

(56) References Cited

U.S. PATENT DOCUMENTS

| | | | |
|---|---|---|---|
| 4,269,095 A * | 5/1981 | Lundberg | 83/391 |
| 4,338,768 A | 7/1982 | Ballestrazzi et al. | |
| 4,397,598 A | 8/1983 | Ess et al. | |
| 5,467,677 A * | 11/1995 | Kinson, Jr. | 83/155 |
| 5,768,966 A * | 6/1998 | Duginske | 83/468.7 |
| 6,234,052 B1 * | 5/2001 | Peters et al. | 83/76.1 |
| 2003/0014376 A1 | 1/2003 | DeWitt et al. | |
| 2009/0000440 A1 * | 1/2009 | Graushar | B26D 1/085 |
| | | | 83/52 |

OTHER PUBLICATIONS

United States Patent and Trademark Office, "Final Office Action," issued in connection with U.S. Appl. No. 14/744,827, dated Dec. 21, 2016, 20 pages.

United States Patent and Trademark Office, "Final Office Action," issued in connection with U.S. Appl. No. 14/744,827, dated Mar. 14, 2018, 15 pages.

United States Patent and Trademark Office, "Final Office action", issued in connection with U.S. Appl. No. 14/744,827, dated Jun. 1, 2017, 10 pages.

United States Patent and Trademark Office, "Non-Final office action", issued in connection with U.S. Appl. No. 14/744,827, dated Oct. 27, 2017, 13 pages.

United States Patent and Trademark Office, "Advisory Action," issued in connection with U.S. Appl. No. 14/744,827, dated May 29, 2018, 3 pages.

United States Patent and Trademark Office, "Advisory action", issued in connection with U.S. Appl. No. 14/744,827, dated Aug. 7, 2017, 3 pages.

* cited by examiner

FIG. 11 ns from any example may be included with, a
APPARATUS FOR USE WITH A TRIMMER TO PRODUCE A PLURALITY OF BOOKS HAVING DIFFERENT TRIM SIZES

RELATED APPLICATION

This patent claims priority to provisional patent application No. 61/139,154 filed on Dec. 19, 2008, which is hereby incorporated herein by reference in its entirety.

FIELD OF THE DISCLOSURE

This patent relates generally to apparatus for use with a trimmer and, more specifically, to apparatus for use with a trimmer to produce a plurality of books having different trim sizes.

BACKGROUND

Postal services currently give postal rate discounts to individuals and/or companies that presort mail to a particular presort level. In such instances, each presort level may have a different postage rate. For example, the cost of postage may decrease depending on the number of pieces of mail presorted and/or the presort level achieved. Additionally, a plurality of different publications can be bundled together to increase the number of publications that qualify for a lower cost postage presort rate. Historically, to co-mail publications having different trim sizes, multiple binders each having a corresponding trimmer were required.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification.

Any features from any example may be included with, a replacement for, or otherwise combined with other features from other examples.

The example methods and apparatus described herein can be used to simultaneously produce and sequence a plurality of different books or copies including all types of bound printed matter such as, for example, magazines, catalogs, brochures, flyers, circulars, hardcover books, paper backs or any other publications, in a predetermined order to co-mail. In particular, the example methods and apparatus described herein can be advantageously utilized to produce books having different back-to-face trim sizes on a single bindery line having a single trimmer.

In some examples, different signatures of different sizes are deposited by feeders on pockets that are associated with a respective size book. The pockets move along a conveyor toward the trimmer. As one of the pockets having the signatures approaches the trimmer, the trimmer adjusts the trim size depending on the size book that the particular pocket is associated with. To adjust for the different size books, the trimmer is provided with a first backstop and a second backstop (e.g., a variable backstop). In practice, if a larger book or first book enters the trimmer, the second backstop is not activated and the spine of the larger book engages the first backstop before the trimmer trims the face of the larger book to form a book having a larger size or first size. In contrast, if a smaller book or second book enters the trimmer, the second backstop is activated and the spine of the smaller book engages the second backstop before the trimmer trims the face of the smaller book to form a book having a smaller size or second size. In some examples, the first backstop may still activate when the smaller book enters the trimmer. However, the placement of the first backstop relative to the second backstop prevents the first backstop from interfering with the trimming of the smaller book. As the different books are trimmed, the different books move toward a stacker, which stacks and packages the books for mailing.

In some examples, a first book may be a magazine that is heavily subscribed to in a geographic area and a second book may be a magazine that is not heavily subscribed to (e.g., has a small-circulation) relative to the first book. Due to the low number of subscriptions for the second book in the geographic area, the second book alone may not be able to qualify for the lower cost postage presort level. However, by co-mailing the first book with the second book, both the first book and the second book may qualify for the lower cost postage presort level. In some alternative examples, multiple books that are small-circulation magazines that do not individually qualify for the lower cost postage presort level may be co-mailed with each other and, thus, a combination of different small circulation magazines may qualify for the lower cost postage presort level. In other examples, different books may be co-mailed for cross-marketing purposes to qualify for even greater discounts or any other suitable purpose.

Figure 1:
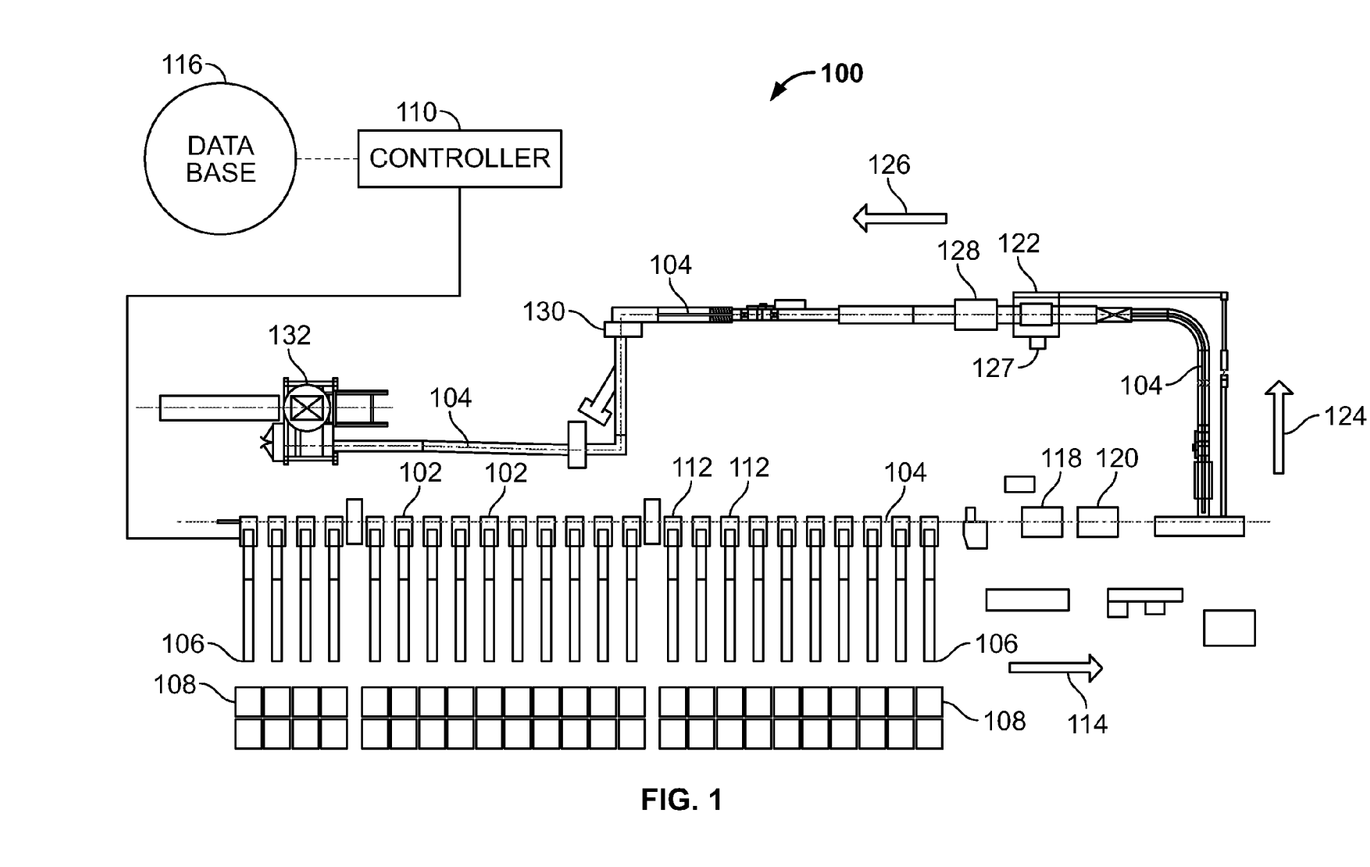
FIG. 1 is a schematic illustration of an example binding system.

As illustrated in FIG. 1, an example bindery system 100 includes a plurality of signature feeders 102 that are positioned near or at a conveyor 104, which may be, for example, a conveyor chain. The bindery system 100 may include any number of signature feeders 102 that may be positioned in any suitable position relative to the conveyor 104. In some examples, the plurality of signature feeders 102 are coupled to a plurality of hoppers 106 that may hold at least one signature (not shown) to be fed to the signature feeders 102. Additionally, in still other examples, at least one of the hoppers 106 may be coupled to at least one additional hopper 108 positioned substantially perpendicular to, parallel to, behind, or otherwise proximate to at least one of the plurality of hoppers 106. The additional hopper 108 may decrease the amount of time needed to reload the hoppers 106 with signatures and/or may increase the amount of signatures (e.g., the signature capacity) that each of the hoppers 106 may hold. If an additional hopper 108 is coupled to at least one of the hoppers 106 (e.g., two additional hoppers 108 are coupled to the hopper 106), each of the signature feeders 102 may be able to feed a plurality of different signatures onto the conveyor when, for example, the first additional hopper 108 has signatures associated with a first book and the second additional hopper 108 has signatures associated with a second book.

The bindery system 100 includes a controller 110 that is communicatively coupled to the plurality of signature feeders 102 and may be communicatively coupled to any other device within the example bindery system 100. As discussed in more detail below in connection with FIGS. 9 and 10, the controller 110 determines a first predetermined order and/or a second predetermined order to deliver signatures to pockets or stations 112 along the conveyor 104. The first and second predetermined orders are based, at least in part, on recipient data (e.g., recipient addresses) of the recipients of the respective book. The recipient data may be stored, for example, in a database 116 and/or any other suitable storage means. In practice, a plurality of different recipient lists may be combined to generate a combined list (e.g., a single combined list) to optimize reductions in postal costs. Books on the list may be produced in any suitable order such as, for example, sequentially, alternating, etc.

Near the plurality of signature feeders 102, the conveyor 104 moves the pockets 112 in a direction generally indicated by arrow 114. As the pockets 112 move in proximity to the front of the plurality of signature feeders 102, the respective signature feeders 102 may deliver a signature onto one or more of the pockets 112. As the pockets 112 move in front of the different signature feeders 102, the signatures may be stacked on top of one another, the last of which may correspond to a front and/or rear cover of a book.

In practice, some of the pockets 112 may be associated with a first book having a first size and some of the other pockets 112 may be associated with a second book having a second size. As such, signatures that correspond to the first book may be delivered to a first pocket 112 and signatures that correspond to a second book may be delivered to a second pocket 112. However, in some examples, at least one of the signature feeders 102 may be used to insert cards and/or inserts into both the first book and the second book. In some examples, the first book may be a first size (e.g., 100 pages) and the second book may be a second size (e.g., 200 pages). Furthermore, the first book may have a different trim size (e.g., the length from the spine of the book to the face of the book) than the second book. The signatures may be any size such as, large formats or table-sized books. Additionally, any particular book at one of the pockets 112 may have the same or different content than another book at another one of the pockets 112, even if the books have the same title.

The bindery system 100 includes a stitcher 118 that stitches the plurality of signatures together to bind the signatures to produce a book. In this example, the stitcher 118 is positioned between the signature feeders 102 and a rejecter 120. However, in other examples, the stitcher 118 may be positioned elsewhere along the bindery system 100. Furthermore, the stitcher 118 may create any type of suitable stitch on the book such as, a saddle stitch or any other type of binding. In other examples, pages are glued together along the backbone of the book and then a cover may be positioned adjacent the backbone to produce a square back book.

The rejecter 120 may identify if a book meets predetermined criteria and/or if a book is defective. In some examples, a book may be defective for having the wrong number of signatures (e.g., too many or too few), misaligned signatures, or one or more wrong signatures. As discussed in more detail in connection with FIGS. 9 and 10, if a book is defective, a replacement book may be reordered via the controller 110 at any time so that the replacement book may be grouped with other books to receive a lower cost postage presort level. The reordered replacement book may be included in a bundle (e.g., a package) of other books with the same carrier route number, the same five digit postal code mailing address, the same first three digits of the postal code mailing address or the same state or provincial mailing address.

If a book is reordered, the controller 110 may change the first predetermined order to a different order (e.g., a second predetermined order) to accommodate re-producing the defective book. In this example, the first predetermined order and the second predetermined order are different, however, in other examples they may be the same or similar. Additionally, the controller 110 may cause the plurality of signature feeders 102 to leave one of the pockets 112 empty, for example, to ensure that the second predetermined order is achieved, as described in greater detail below.

In the illustrated example of FIG. 1, after the books have been stitched, the conveyor 104 (e.g., a single mail stream) moves the pockets 112 toward a trimmer 122 (e.g., HT style trimmer) in a direction indicated by arrows 124 and 126. In some examples, all of the pockets 112 may have a book on them. However, in other examples, some pockets 112 may be left empty, i.e., with no book on them. The trimmer 122 includes a plurality of cutters (e.g., blades, edges) that are adjusted to cut at least one of the edges of the different books so that all of the pages of the respective books have substantially the same dimensions and/or are flush with one another. The trimmer 122 may include a first station to cut a face of a book and a second station to cut a head and a foot of the book. However, the trimmer 122 may include any number of stations (e.g., 1, 2, 3, 4, 5, etc.) to cut the different edges of the book. In some examples, the trimmer 122 may be provided with a sensor 127 (e.g., an eye detector) to distinguish between the different size books. While the sensor 127 is depicted as adjacent the trimmer 122, the sensor 127 may be positioned in any position on the bindery system 100. Additionally or alternatively, the controller 110 may associate and/or identify the different size books along the conveyor 104 and transmit this information to the trimmer 122. As discussed in more detail below, the trimmer 122 is implemented with an example assembly or variable backstop assembly 202 (FIG. 2) that enables the trimmer 122 to cut different books having different trim sizes and/or different numbers of pages.

The example bindery system 100 also includes an addresser 128. The addresser 128 may be an imager (e.g., a printer), a labeler and/or any other suitable device. The addresser 128 customizes and/or personalizes the plurality of different books, for example, by addressing the books with the intended recipient's name and/or address. The addresser 128 may address an insert (not shown) that is to be inserted into the respective book. While the addresser 128 is depicted as adjacent the trimmer 122, the addresser 128 may be located at another location on the bindery system 100.

While the example bindery system 100 is depicted as having one addresser 128, the bindery system 100 may have any number of addressers 128 (e.g., 1, 2, 3, etc.) to personalize the different books. In other examples, the signatures may include pre-printed addresses (e.g., digitally printed signatures) and, thus, the bindery system 100 may not include the addresser 128.

After the plurality of different books are trimmed, the conveyor 104 leads to a stacker 130, which sorts and/or packages the plurality of different books. The order in which the stacker 130 places (e.g., intermingles) the different books may be an order that is the same as the first predetermined order, the second predetermined order or any other suitable order to optimize postal discounts. The example stacker 130 (e.g., a backend stacker) groups the plurality of different books into packages (e.g., bundles) that have the same mailing presort level. Further, any number of stackers (e.g., 1, 2, 3, etc.) may be used. While the above examples describe sorting a first book and a second book, the example bindery system 100 may produce any number of different books (e.g., a first book, a second book, a third book, a fourth book, etc.) at the same time. In this example, after the plurality of different books are packaged, the packages may move along the conveyor 104 to a palletizer 132, which places the different packages onto pallets for shipment.

Figure 2:
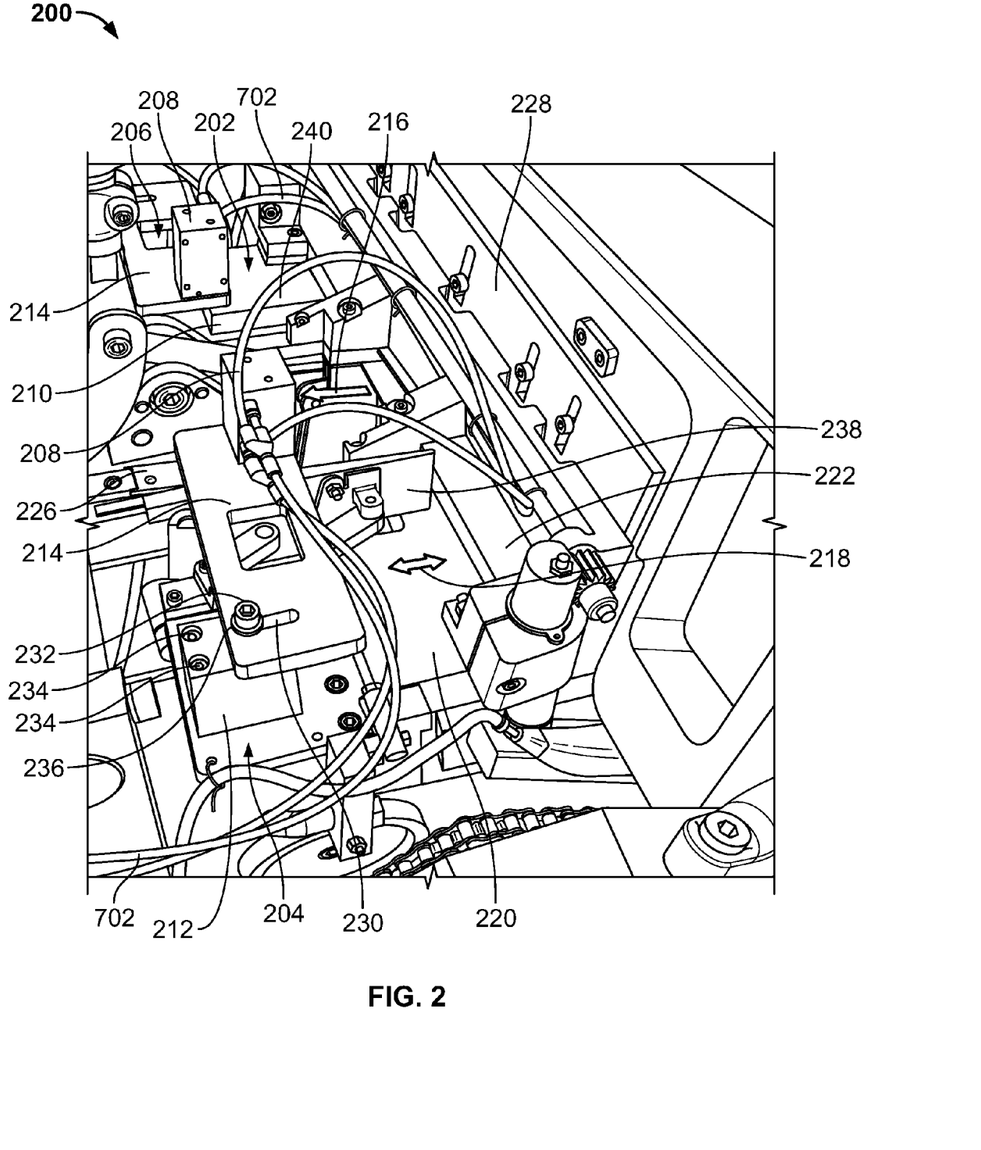
FIG. 2 depicts an example assembly implemented on an example trimmer that may be used in the example binding system of FIG. 1.
Figure 3:
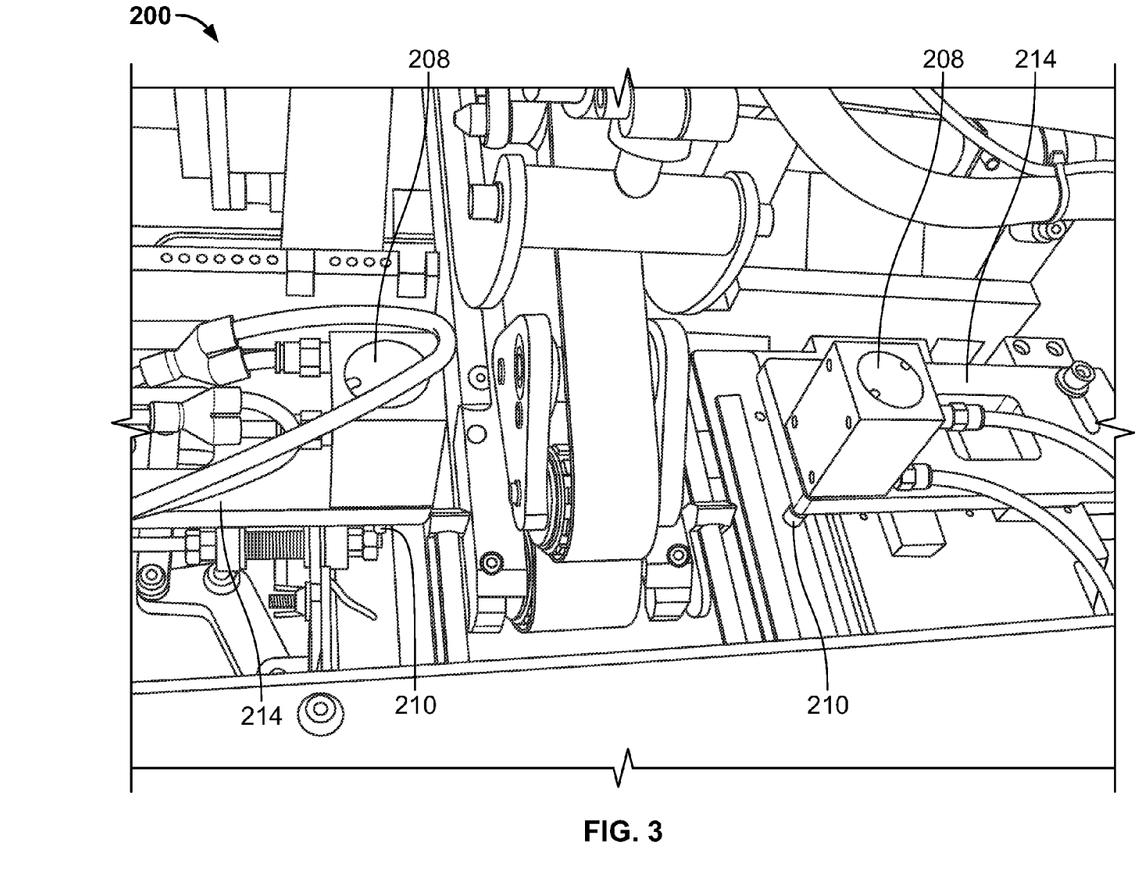
FIG. 3 depicts another view of the example assembly and trimmer of FIG. 2.
Figure 7:
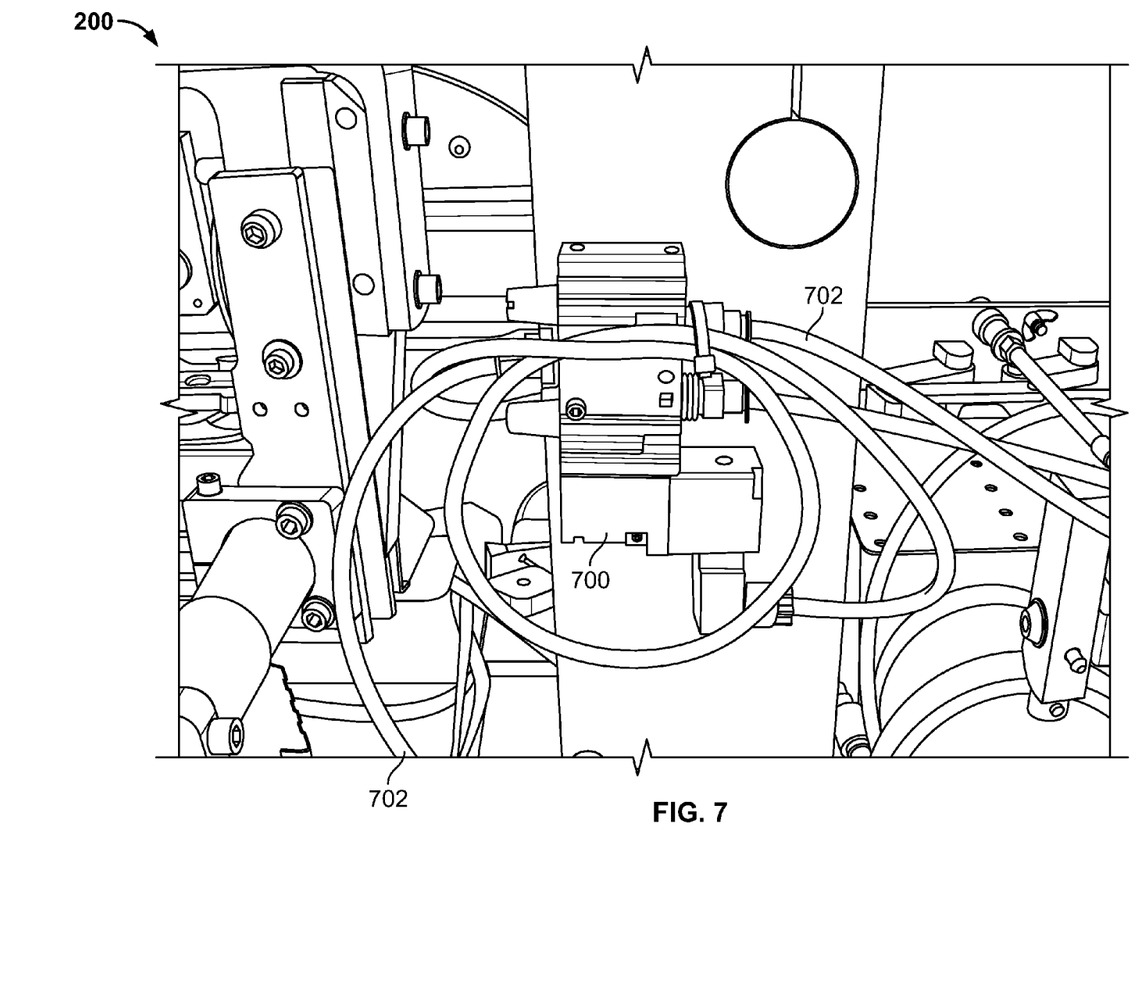
FIG. 7 depicts a valve that can be used in the example assembly of FIG. 2.

FIGS. 2 and 3 depict an example trimmer 200 that includes the example assembly 202 that may be used to implement the trimmer 122 of FIG. 1. The assembly 202 may include a first side 204 and a second side 206 that may be substantially mirror images of one other. In practice, for example, a corner of a book may be adjacent the first side 204 and another corner of the book may be adjacent the second side 206. The first side 204 and the second side 206 may each include an air cylinder or actuator 208 having an extension pin or member 210 (e.g., a second backstop, a second movable backstop, a variable backstop), a mounting block 212 and a bracket 214. Additionally, the assembly 202 may include a proximity sensor 802 (FIG. 8), a bracket 804 (FIG. 8) and a valve (e.g., a Mac valve) 700 (FIG. 7). While the brackets 214 depicted in FIGS. 2 and 3 are provided with a single air cylinder 208 having the extension pin 210 extendable therefrom, in other examples, the brackets 214 may be provided with any other number of air cylinder 208 (e.g., 1, 2, 3, 4, etc.) having one or more extension pins 210. Such an approach may enable more books (e.g., 3, 4, etc.) having different trim sizes to be trimmed by the trimmer 200 and/or to decrease downtime incurred by adjusting the trimmer 200 to accommodate different trim sizes and/or during a changeover.

In practice, the books (e.g., the pockets 112) move in a direction generally indicated by arrow 216 through a gap 218 between a knife table or cutting surface 220 and a clamp 222. As discussed above, the controller 110 may associate each of the pockets 112 with either a larger book or a smaller book and convey to the trimmer 200 to adjust (e.g., automatically adjust) to cut the different sizes accordingly. Additionally or alternatively, the trimmer 200 may be provided with the sensor 127 that identifies whether the book is a larger book or a smaller book. In such examples, the sensor 127 conveys to the trimmer 200 to adjust accordingly to cut the particular size of the book. If a larger book protrudes through the gap 218, the extension pins 210 of both the first side 204 and the second side 206 are at a distance from and/or are retracted relative to the knife table 220 to enable the larger book to be stopped by a first backstop or first movable backstop 226 (e.g., an existing backstop, an original backstop) instead of being stopped by the extension pins 210. The first backstop 226 may ascend up through the knife table 220. The larger book moves in a direction generally indicated by the arrow 216 until a spine of the larger book engages the first backstop 226, at which point the clamp 222 descends to clamp the larger book between the knife table 220 and the clamp 222. Once the larger book is secured relative to the knife table 220, a cutter 228 moves to cut the face of the larger book. After the face of the larger book is cut, the clamp 222 moves away from the knife table 220 and the first backstop 226 descends back below the knife table 220 to enable the larger book to move toward another station (not shown) of the trimmer 200 where the head and the foot of the larger book may be cut. Once the different edges of the larger book are cut, the larger book continues down the conveyor (e.g., the conveyor 104 of FIG. 1) toward the stacker (e.g., the stacker 130 of FIG. 1).

Alternatively, if a smaller book protrudes through the gap 218, a signal is sent to the air cylinders 208 to activate or extend the extension pins 210 such that the extension pins 210 (e.g., the second backstop) moves toward the knife table 220 to stop the smaller book. The smaller book moves in a direction generally indicated by the arrow 216 until a spine of the smaller book engages the extension pins 210, at which point the clamp 222 descends to clamp the smaller book between the knife table 220 and the clamp 222. Once the smaller book is secured relative to the knife table 220, the cutter 228 moves to cut a face of the smaller book. After the face of smaller book is cut, the clamp 222 moves away from the knife table 220 and the extension pins 210 ascend away from and/or are retracted relative to the knife table 220 to enable the smaller book to move toward the other station of the trimmer 200 where the head and the foot of the smaller book may be cut. Once the different edges of the smaller book are cut, the smaller book continues down the conveyor (e.g., the conveyor 104 of FIG. 1) toward the stacker (e.g., the stacker 130 of FIG. 1).

To enable the example trimmer 200 to be adjusted (e.g., field adjusted) to accommodate different size books, the bracket 214 of the assembly 202 is provided with a slot or adjuster 230 through which a fastener 232 is positioned to couple the bracket 214 to the mounting block 212. The mounting block 212 is coupled to the knife table 220 via a plurality of fasteners 234. In some examples, the length of the slot 230 may be about one inch. However, the slot 230 may have any other suitable length (e.g., 0.25 inch, 0.5 inch, 0.75 inch, 1 inch, 1.25 inches, etc.) and/or shape. To adjust the trimmer 200 if the difference between the back-to-face trim size of the different books is approximately one inch and the length of the slot 230 is one inch, the fasteners 232 are loosed using a tool (e.g., an Allen wrench) and then the bracket 214 is moved toward the clamp 222 until the fastener 232 engages an end 236 of the slot 230. The fasteners 232 are then retightened and the trimmer 200 is ready for operation. Alternatively, to adjust the trimmer 200 if the difference between the back-to-face trim size of the different books is approximately one half inch and the length of the slot 230 is one inch, the fasteners 232 are loosed using a tool (e.g., an Allen wrench) and then the bracket 214 is moved toward the clamp 222 until the fastener 232 is positioned approximately in the middle of the slot 230. The fasteners 232 are then retightened and the trimmer 200 is ready for operation. While the above described example relates to manually adjusting the bracket 214 relative to the knife table 220, in other examples, at least a portion of the assembly 202 may be partially-automatically adjusted, automatically adjusted, etc., relative to the knife table 220 to accommodate different size books. Particularly, the trimmer 200 may be provided with a motor, a servo motor, or any other suitable means to move the extension pins 210 to accommodate different trim sizes. In practice, the servo motor may incrementally adjust the position of the extension pins 210, for example, by one eighth inch increments, to enable numerous books to be produced on the bindery system 100 having any number (e.g., 1, 2, 3, 4, 5, etc.) of different trim sizes.

Figure 4:
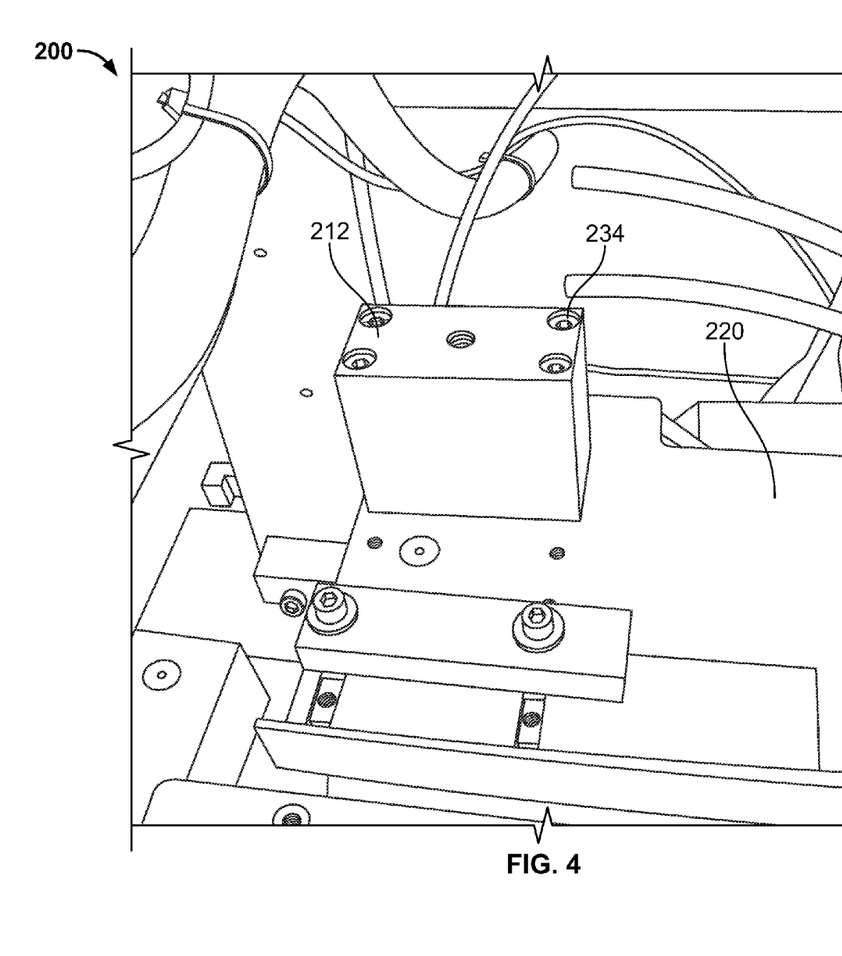
FIG. 4 depicts an example mounting block coupled to the example trimmer of FIG. 2.
Figure 5:
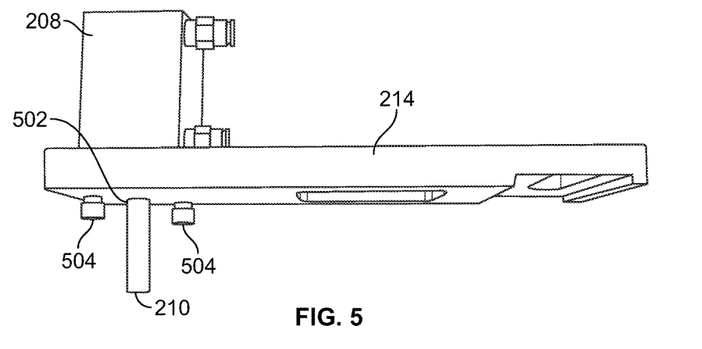
FIG. 5 depicts an example bracket having an actuator that can be used in the example assembly of FIG. 2.
Figure 6:
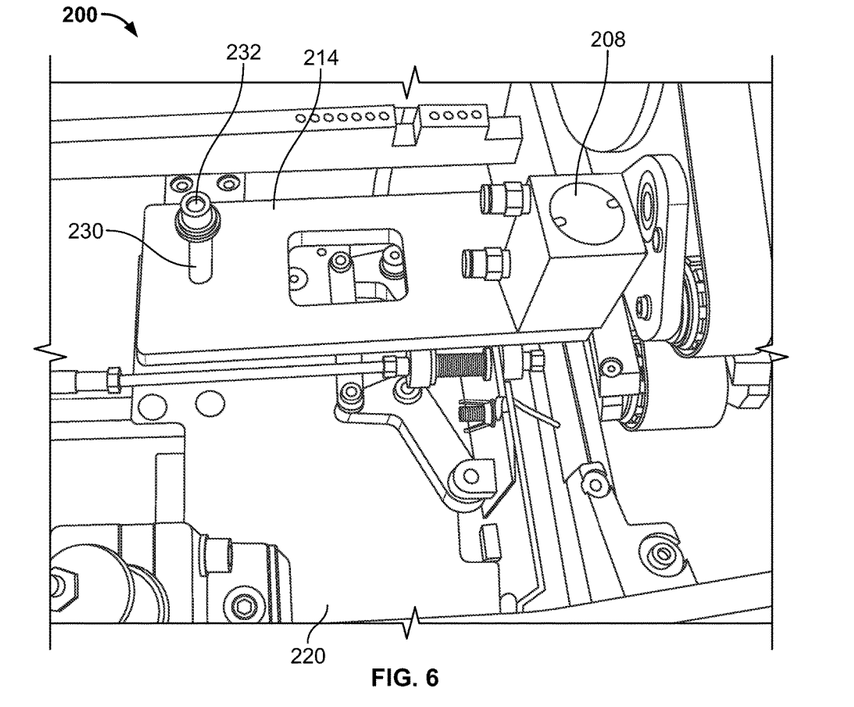
FIG. 6 depicts the example of FIG. 5 coupled to the example mounting block of FIG. 4.

To retrofit an existing trimmer with the example assembly 202, as depicted in FIG. 4, the mounting block 212 is coupled to the knife table 220 via the fasteners 234. The fasteners 234 may thread into preexisting threaded holes (not shown) (e.g., preexisting adjustment taped holes) or newly drilled holes. In particular, as shown in FIG. 2, one of the mounting blocks 212 is coupled to the knife table 220 adjacent a jogger 238 and the other mounting block 212 is coupled to the knife table 220 adjacent a head guide 240. Next, as shown in FIG. 5, the extension pin 210 of the air cylinder 208 is positioned through an aperture 502 of the bracket 214 (e.g., a left bracket and a right bracket) and a plurality of fasteners 504 are then threaded through the bracket 214 to couple the air cylinder 208 to the bracket 214. The fastener 232 is then positioned through the slot 230 of the bracket 214 and threaded into the respective mounting block 212 to couple the bracket 214 to the mounting block 212. As discussed above, the position of the fastener 323 within the slot 230 corresponds to the back-to-face trim size of the smaller book and/or a trim size difference between the books. FIG. 7 depicts the valve 700 (e.g., a mac valve) mounted to the trimmer 200 and a plurality of flowlines 702 that fluidly couple the air cylinders 208 and the valve 700. In practice, the valve 700 controls the flow of fluid (e.g., air) to the air cylinders 208 and, thus, the position of the extension pins 210 and/or the first backstop 226 relative to the knife table 220.

Figure 8:
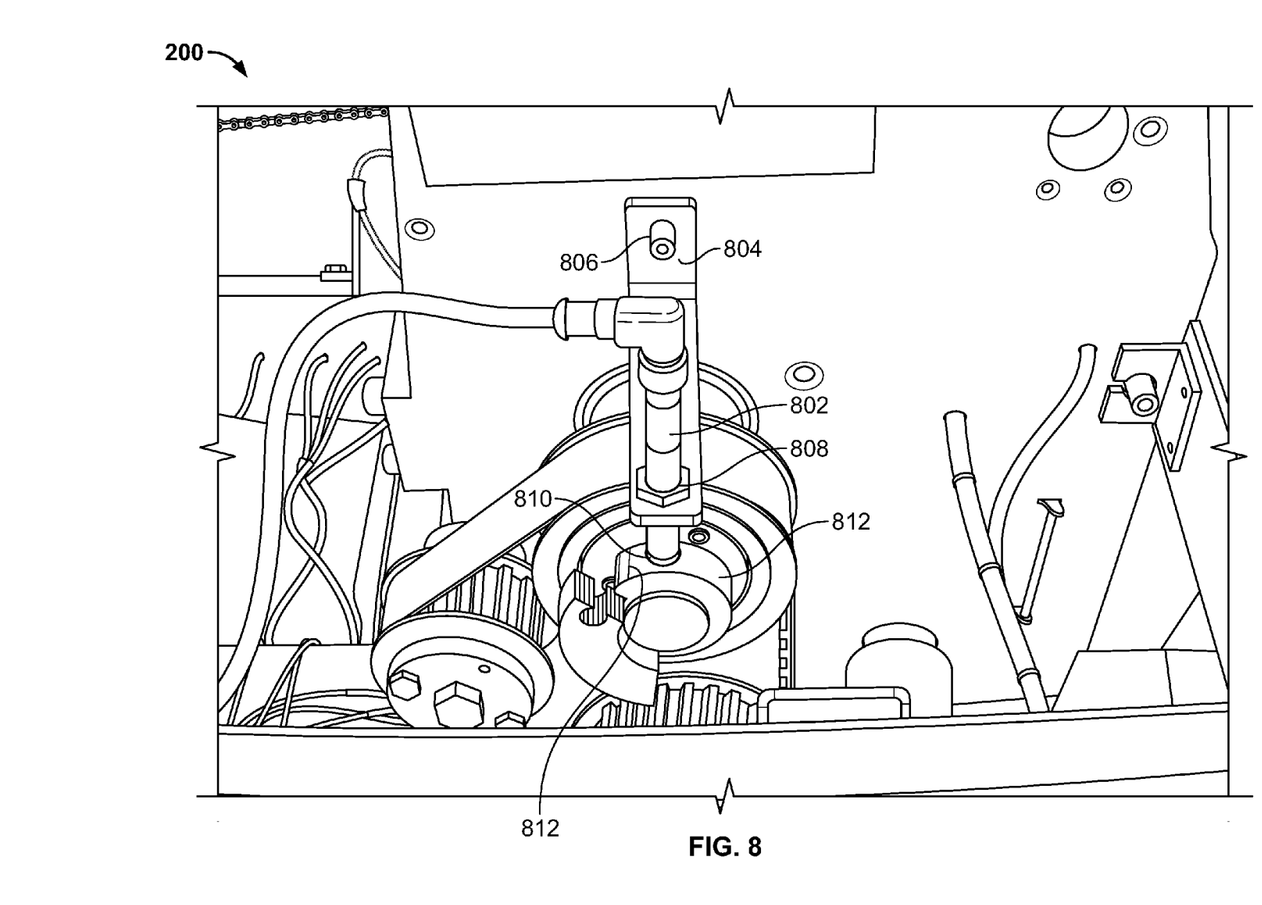
FIG. 8 depicts a bracket and a proximity sensor used in the example apparatus of FIG. 2.

FIG. 8 depicts the bracket 804 coupled to the trimmer 200 via a fastener 806. The proximity sensor 802 is partially positioned in an aperture 808 of the bracket 804. An end 810 of the proximity sensor 802 is positioned adjacent a target 812 to identify the position of the target 812. The position of the target 812 relative to the proximity sensor 802 is associated with a position of a book relative to the trimmer 200. To set-up the trimmer 200 to trim particular trim sizes, original backstops (e.g., the first backstop 226 of FIG. 2) are adjusted to the longest trim book size and the brackets 214 are adjusted such that the extension pins 210 are positioned to correspond to the shortest trim book size. Next, the target 812 is adjusted to enable the proximity sensor 802 to identify the position of the target 812 when the smaller book is positioned approximately five inches from the extension pins 210. As such, when the proximity sensor 802 identifies the position of the target 812, a signal is sent to the valve 700, which in turn sends a signal to move the extension pins 210 toward the knife table 220 to enable the spine of the smaller book to engage the extension pins 210.

Figure 9:
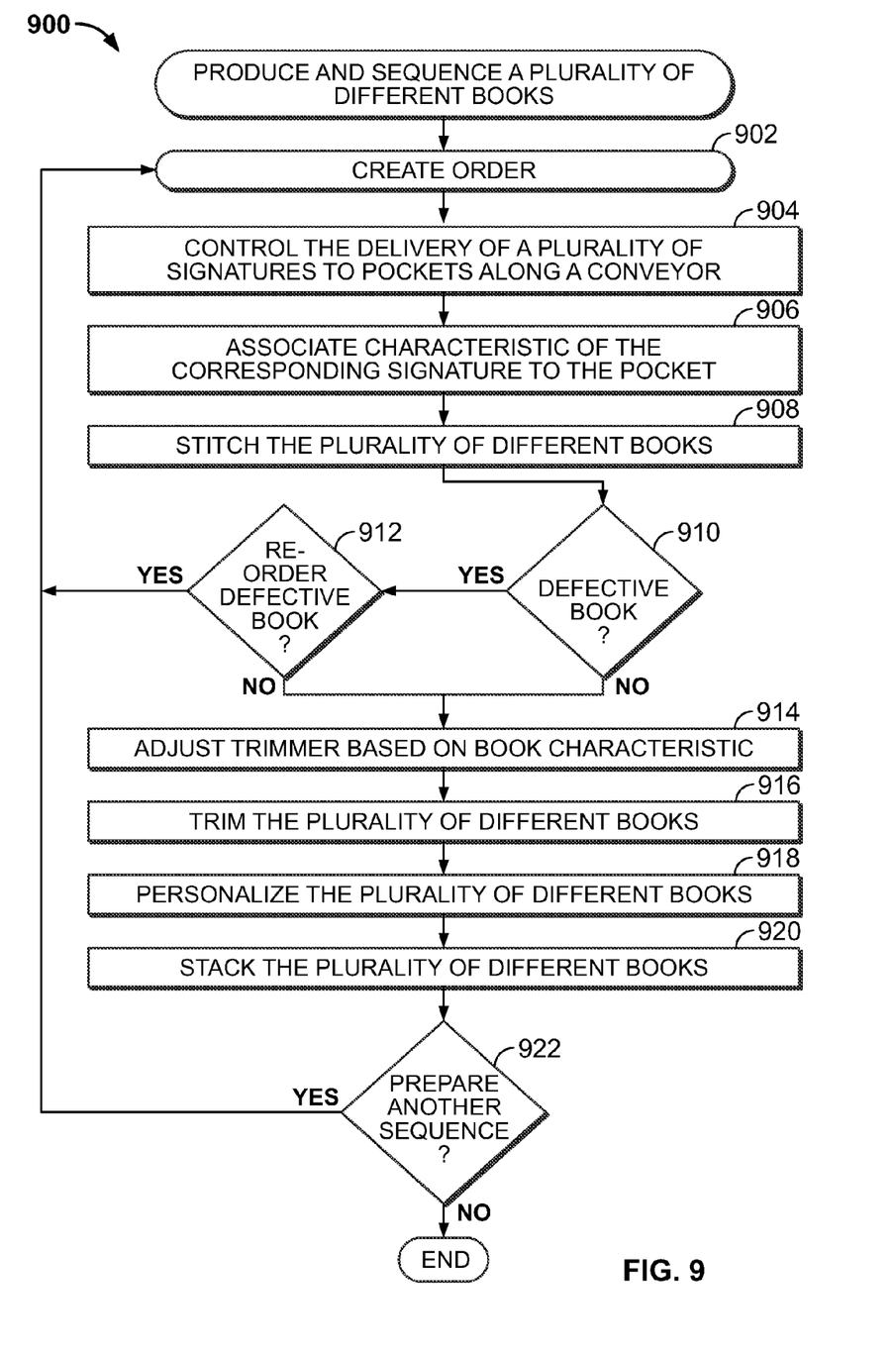
FIG. 9 is an example flow diagram of an example process to produce and sequence books of different sizes.
Figure 10:
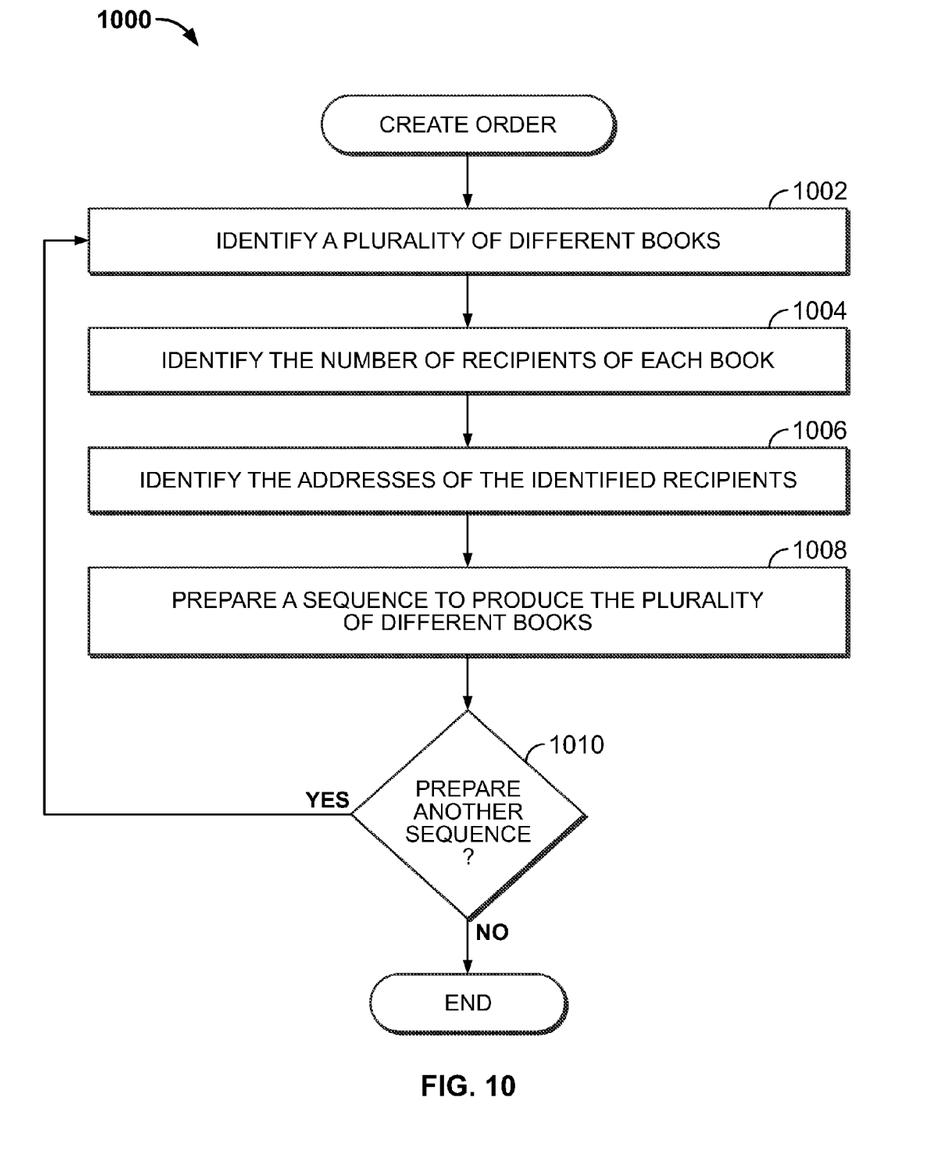
FIG. 10 is a flow diagram of an example process to create an order used in the example process of FIG. 9.

FIGS. 9 and 10 are flowcharts of example methods 900 and 1000 that can be used to produce and sequence a plurality of different books. The example processes of FIGS. 9 and 10 may be used to implement the example bindery system 100 of FIG. 1 and the example trimmer 200 of FIG. 2. The example methods of FIGS. 9 and 10 may be used to implement the example controller 110 (FIG. 1), the trimmer 122 (FIG. 1) or the trimmer 200 (FIG. 2). The example methods of FIGS. 9 and 10 may be implemented using software, firmware and/or hardware. In some example implementations, the flowcharts can be representative of example machine readable instructions, and the example methods of the flowcharts may be implemented entirely or in part by executing the machine readable instructions. Such machine readable instructions may be executed by, for example, the controller 110 of FIG. 1. In particular, a processor or any other suitable device to execute machine readable instructions may retrieve such instructions from a memory device (e.g., a random access memory (RAM), a read only memory (ROM), etc.) and execute those instructions. In some example implementations, one or more of the operations depicted in the flowcharts of FIGS. 9 and 10 may be implemented manually. Although the example methods are described with reference to the flowcharts of FIGS. 9 and 10, persons of ordinary skill in the art will readily appreciate that other methods to implement the example bindery system 100 can be used to produce and sequence a plurality of different books. For example, the order of execution of the blocks depicted in the flowcharts of FIGS. 9 and 10 may be changed and/or some of the blocks described may be rearranged, eliminated, or combined.

FIG. 9 is a flow diagram depicting the example method 900 of producing and sequencing a plurality of different books. Initially, an order is prepared or created (block 902) by, for example, the controller 110 of FIG. 1, in which to produce the different books. The example method 1000 discussed below in connection with FIG. 10 may be used to implement the operation(s) of block 902 to create the order. The controller 110 controls when the plurality of signature feeders 102 delivers signatures to the pockets 112 along the conveyor 104 (block 904). Additionally, the controller 110 may associate a characteristic of the signature being delivered to pocket 112 with the particular pocket (block 906). For example, if the signature being delivered to the pocket 112 corresponds to a larger book, the controller 110 is to associate the particular pocket 112 with the larger book. Alternatively, if the signature being delivered to the pocket 112 corresponds to a smaller book, the controller 110 is to associate the particular pocket 112 with the smaller book. As discussed above, the different signature feeders 102 may deliver different signatures to the pockets 112 associated with the same or different books. Additionally, the bindery system 100 may produce a plurality of different books in any predetermined order. The predetermined order may correspond to an order that increases the number of books that qualify for a lower cost postage presort level.

After the particular number of signatures (e.g., a number of signatures to produce a complete book) has been delivered to the pockets 112, the stitcher 118 stitches and/or binds the plurality of signatures together to produce a book (block 908). The stitcher 118 may produce any type of stitch such as, for example, a saddle stitch, or any other type of binding, as noted above. In other examples, pages are glued together along the backbone and then a cover may be positioned adjacent the backbone to produce a square back book.

After the books are stitched by the stitcher 118, the rejecter 120 identifies if any of the books are defective (block 910). If books are identified as defective, the controller 110 may cause a replacement for the books to be re-ordered (block 912). In some examples, if books are reordered, the plurality of signature feeders 102 may leave one or more pockets 112 along the conveyor 104 empty to ensure that the predetermined order is achieved. Additionally, replacements for defective books may be re-ordered at any time and may be placed in a package of other books that have at least one of the same carrier route number, the same five digit postal code mailing address, the same first three digits of the postal code mailing address or the same state, or provincial mailing address. The type of presort level in which the re-ordered books are placed, corresponds to the amount of postal rate discounts. Further, when defective books are re-ordered, the controller 110 may change the first predetermined order to a second predetermined order to accommodate the change in production. The sequence in which the plurality of books are produced may change depending on a multitude of factors such as, for example, the number of books that are identified as defective. The second predetermined order maximizes the number of books that qualify for the lower cost postage presort level.

However, if the books are not identified as defective, the books move toward the trimmer 122 or 200. In particular, as the different books move toward the trimmer 122 or 200, the trimmer 122 or 200 adjusts depending on the size book entering the trimmer 122 or 200 (e.g., the larger size book or the smaller size book) (block 914). To identify the size of the book, the trimmer 122 may be provided with the sensor 127 (e.g., an eye detector) and/or the controller 110 may associate and/or identify the different size books along the conveyor 104 and transmit this information to the trimmer 122. The trimmer 122 or 200 then trims the plurality of different books to a particular trim size (block 916) to remove any rough edges and/or make all of the pages of the respective books substantially the same size. As discussed above, the trimmer 122 or 200 may include a plurality of stations to cut the face, the head and/or the foot of the book, respectively.

After the books have been trimmed, the books may be personalized (block 918). Books may be personalized by any suitable method such as, for example, an insert, which may include the recipient's name, address, etc., may be inserted into each of the different books. While in this example, personalizing the books is discussed after the books are trimmed, the books may be personalized at any point in the process.

From the trimmer 122 or 200, the books move toward the stacker 130 that stacks and/or bundles the plurality of different books (block 920) into packages based, at least in part, on the postage presort level. The bundles then move toward the palletizer 132 that places the plurality of bundles onto pallets for shipment. The bindery system 100 then determines whether it should prepare another sequence (block 922). For example, if the bindery system 100 has not received an instruction or command to stop preparing a sequence, the bindery system 100 may determine that it should prepare another sequence (block 922). Otherwise the process of FIG. 9 is ended. It should be appreciated that any of the blocks of the method 900 of FIG. 9 may be performed simultaneously and/or in parallel and, thus, books may be continuously produced with little or no delay between producing, for example, books associated with a first carrier route number, and books associated with a second carrier route number.

FIG. 10 is a flow diagram depicting an example process that may used to implement the operation of block 902 of FIG. 9. Initially, the controller 110 identifies a plurality of different books to be produced (block 1002). The different books to be produced may be differently titled periodicals, catalogs or any other suitable bound printed material. The controller 110 also identifies the number of recipients of each book (block 1004) and identifies the addresses of each of the recipients (block 1006). The controller 110 combines the recipients' addresses from the first book with the addresses of the recipients from the second book to produce the predetermined order to produce and sequence the plurality of different books to co-mail (block 1008). In some examples, the predetermined order substantially corresponds to an order that qualifies for a postage presort discount and maximizes the postages rate discount. Additionally, the predetermined order may be an order where substantially all of the books have the same carrier route number, the same five digit postal code mailing address, the same first three digits of the postal code mailing address, or the same state or provincial mailing address.

If a book is identified as defective, a replacement book may be reordered via the controller 110 at any time so that the replacement book may be grouped with other books to receive a low cost postage presort level. In some examples, the defective book may have initially been grouped with other books having the same carrier route number, however, the replacement book may be grouped with other books having the same first three digits of the postal code mailing address because there may not be enough time to place the replacement book with books having the same carrier route number. However, in other examples, the defective book may be immediately reordered and placed in the same carrier route number if, for example, the books for the particular carrier route number have not all been produced. The bindery system 100 then determines whether it should prepare another sequence (block 1010). For example, if the bindery system 100 has not received an instruction or command to stop preparing a sequence, the bindery system 100 may determine that it should prepare another sequence (block 1010). Otherwise the process of FIG. 10 is ended. It should be appreciated that any of the blocks of the method 1000 of FIG. 10 may be performed simultaneously and/or in parallel and, thus, books may be continuously produced with little or no delay between producing, for example, books associated with a first carrier route number and books associated with a second carrier route number.

Figure 11:
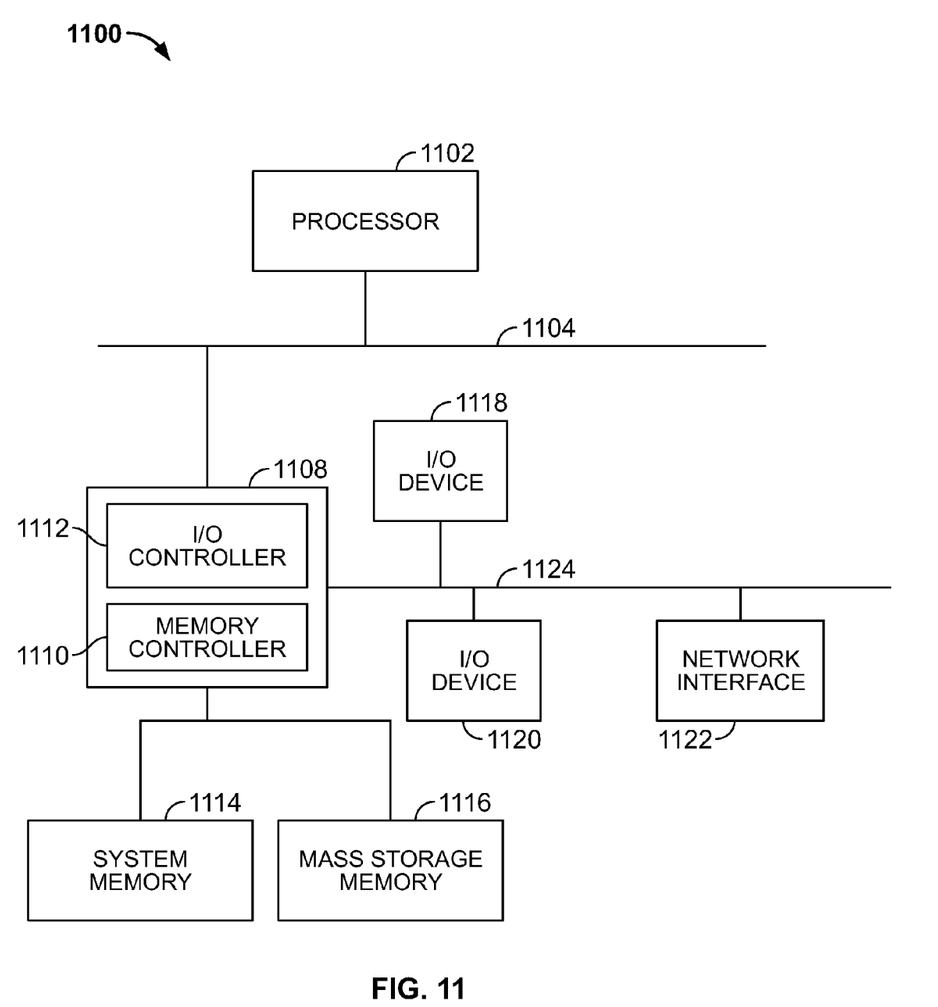
FIG. 11 illustrates an example system to implement the controller of FIG. 1.

FIG. 11 is a block diagram of an example processor system 1100 that may be used to implement the apparatus and methods described herein. As shown in FIG. 11, the processor system 1100 includes a processor 1102 that is coupled to an interconnection bus 1104. The processor 1102 may be any suitable processor, processing unit or microprocessor. Although not shown in FIG. 11, the processor system 1100 may be a multi-processor system and, thus, may include one or more additional processors that are identical or similar to the processor 1102 and that are communicatively coupled to the interconnection bus 1104.

The processor 1102 of FIG. 11 is coupled to a chipset 1108, which includes a memory controller 1110 and an input/output (I/O) controller 1112. As is well known, a chipset typically provides I/O and memory management functions as well as a plurality of general purpose and/or special purpose registers, timers, etc. that are accessible or used by one or more processors coupled to the chipset 1108. The memory controller 1110 performs functions that enable the processor 1102 (or processors if there are multiple processors) to access a system memory 1114 and a mass storage memory 1116.

The system memory 1114 may include any desired type of volatile and/or non-volatile memory such as, for example, static random access memory (SRAM), dynamic random access memory (DRAM), flash memory, read-only memory (ROM), etc. The mass storage memory 616 may include any desired type of mass storage device including hard disk drives, optical drives, tape storage devices, etc.

The I/O controller 1112 performs functions that enable the processor 1102 to communicate with peripheral input/output (I/O) devices 1118 and 1120 and a network interface 1122 via an I/O bus 1124. The I/O devices 1118 and 1120 may be any desired type of I/O device such as, for example, a keyboard, a video display or monitor, a mouse, etc. The network interface 1122 may be, for example, an Ethernet device, an asynchronous transfer mode (ATM) device, an 802.11 device, a DSL modem, a cable modem, a cellular modem, etc. that enables the processor system 1100 to communicate with another processor system.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A trimmer for use with a bindery system, comprising:
a cutting surface;
a first movable backstop adjacent the cutting surface to be engaged by a first book intermediate;
a second movable backstop adjacent the cutting surface and spaced from the first movable backstop, wherein the second movable backstop is to be engaged by a second book intermediate, wherein the second movable backstop includes an extension pin extendable from an actuator;
a bracket into which at least one of the extension pin or the actuator is at least partially positioned, wherein the bracket includes an adjuster to enable adjustment of a position of the bracket relative to the cutting surface, and wherein the adjuster includes a slot to receive a fastener, the fastener to extend through the slot to couple the bracket to the cutting surface;
a cutter comprising an edge, the edge to cut a first face of the first book intermediate to form a first book having a first size and to cut a second face of the second book intermediate to form a second book having a second size different than the first size;
a database comprising recipient data; and
a controller coupled to the database,
based on the recipient data, the controller to determine an order that the first and second books are to be produced,
in response to the controller determining a presence of the first book intermediate near the cutting surface, the controller to selectively activate the first movable backstop to enable the engagement between the first book intermediate and the first movable backstop, and
in response to the controller determining a presence of the second book intermediate near the cutting surface, the controller to selectively activate the second movable backstop to enable the engagement between the second book intermediate and the second movable backstop.

2. A trimmer as defined in claim 1, wherein the first movable backstop is different from the second movable backstop.

3. A trimmer as defined in claim 1, further including a mounting block coupled to the cutting surface, the bracket coupled to the mounting block.

4. A trimmer as defined in claim 1, wherein the bracket is operatively coupled to the cutting surface.

5. The trimmer as defined in claim 1, wherein the edge comprises a blade that defines a plurality of slots through which a corresponding guide is to extend to linearly guide the edge relative to the cutting surface.

6. The trimmer as defined in claim 1, wherein the edge comprises a length that corresponds to the first face of the first book and the second face of the second book.

7. The trimmer as defined in claim 1, further comprising a clamp to clamp the first book intermediate and the second book intermediate as the edge descends relative to the cutting surface to cut the first face of the first book intermediate and the second face of the second book intermediate.

8. A trimmer as defined in claim 1, wherein the edge comprises a length associated with a width of the cutting surface.

9. A trimmer as defined in claim 1, wherein the cutter comprises a book cutter.

10. A trimmer as defined in claim 1, further comprising a book conveyor to move the first book intermediate and the second book intermediate through the trimmer.

11. A trimmer as defined in claim 10, wherein the book conveyor comprises opposing conveyors to move the first book intermediate, the first book, the second book intermediate, and the second book through the trimmer.

12. A trimmer as defined in claim 1, further comprising a sensor to identify a book intermediate as the first book intermediate or the second book intermediate, the sensor to provide data to the controller based on the book intermediate identified, based on the data provided by the sensor, the controller to activate the first movable backstop or the second movable backstop.

13. The trimmer as defined in claim 1, wherein the slot extends between the cutter and the first movable backstop.

14. The trimmer as defined in claim 1, wherein the slot extends in a direction substantially perpendicular to the edge.

15. A trimmer as defined in claim 1, wherein the controller is to retract the second movable backstop when the first movable backdrop is activated.

16. A trimmer as defined in claim 1, wherein the edge is to cut the first face of the first book intermediate in a single back-and-forth motion-to form the first book and to cut the second face of the second book intermediate in a single back-and-forth motion to form the second book having the second size.

17. A trimmer as defined in claim 1, wherein the controller is to determine the presence of the first book intermediate near the cutting surface based on the determined order.

18. A trimmer for use with a bindery system, comprising:
a cutting surface;
means for stopping a book in a first position relative to the cutting surface, the means for stopping the book in the first position including a movable stop that includes an extension pin extendable from an actuator;
a bracket into which at least one of the extension pin or the actuator is at least partially positioned, wherein the bracket includes an adjuster to enable adjustment of a position of the bracket relative to the cutting surface, the adjuster including a slot that receives a fastener, the fastener to extend through the slot to couple the bracket to the cutting surface;
means for stopping the book in a second position relative to the cutting surface;
a cutter movable relative to the cutting surface to cut a first face of the book to a first size when the book is in the first position and to cut the first face or a second face of the book to a second size when the book is in the second position, wherein, after the cutter has cut the book having the first size, the book is to move past the means for stopping the book in the first position, wherein, after the cutter has cut the book having the second size, the book is to move past the means for stopping the book in the second position;

a database comprising recipient data; and
a controller coupled to the database,
  based on the recipient data, the controller to determine an order that first and second size books are to be produced,
  in response to the controller determining to cut the book to the first size, the controller to selectively activate the means for stopping the book in the first position to enable the cutter to cut the first face of the book to the first size,
  in response to the controller determining to cut the book to the second size, the controller to selectively activate the means for stopping the book in the second position to enable the cutter to cut the first face or the second face of the book to the second size.

19. A trimmer as defined in claim 18, wherein the bracket is operatively coupled to the cutting surface.

20. A trimmer as defined in claim 18, further comprising means for identifying when to cut the book to the first size and when to cut the book to the second size.

21. A trimmer for use with a bindery system, comprising:
a cutting surface;
a first movable backstop adjacent the cutting surface to be engaged by a first book intermediate;
a second movable backstop adjacent the cutting surface and spaced from the first movable backstop, wherein the second movable backstop is to be engaged by a second book intermediate, wherein the second movable backstop includes an extension pin extendable from an actuator;
a bracket into which at least one of the extension pin or the actuator is at least partially positioned, wherein the bracket includes an adjuster to enable adjustment of a position of the bracket relative to the cutting surface, and wherein the adjuster includes a slot to receive a fastener, the fastener to extend through the slot to couple the bracket to the cutting surface;
a cutter, wherein the first book intermediate is to pass through a gap defined by the cutting surface and the cutter and engage the first movable backstop and the second book intermediate is to pass through the gap and engage the second movable backstop, wherein, after the first book intermediate has engaged the first movable backstop, the cutter is to descend relative to the cutting surface and cut a first face of the first book intermediate to form a first book having a first size, wherein, after the second book intermediate has engaged the second movable backstop, the cutter is to descend relative to the cutting surface and cut a second face of the second book intermediate to form a second book having a second size;
a database comprising recipient data; and
a controller coupled to the database,
  based on the recipient data, the controller to determine an order that the first and second books are to be produced,
  in response to the controller determining a presence of the first book intermediate, the controller to activate the first movable backstop to enable the engagement between the first book intermediate and the first movable backstop,
  in response to the controller determining a presence of the second book intermediate, the controller to activate the second movable backstop to enable the engagement between the second book intermediate and the second movable backstop.

* * * * *

UNITED STATES PATENT AND TRADEMARK OFFICE
CERTIFICATE OF CORRECTION

Page 1 of 1

PATENT NO.        : 10,160,128 B2
APPLICATION NO.   : 12/533830
DATED             : December 25, 2018
INVENTOR(S)       : Chris E. Brown It is certified that error appears in the above-identified patent and that said Letters Patent is hereby corrected as shown below:

In the Claims

Column 12, Line 33 Claim 15 delete "backdrop" and add -- backstop --.

Signed and Sealed this
Ninth Day of April, 2019

Andrei Iancu
*Director of the United States Patent and Trademark Office*